Dec. 20, 1966   C. A. STRANGE   3,292,211
SELF-ADJUSTING EXTRUSION DIE
Filed May 27, 1963   2 Sheets-Sheet 2
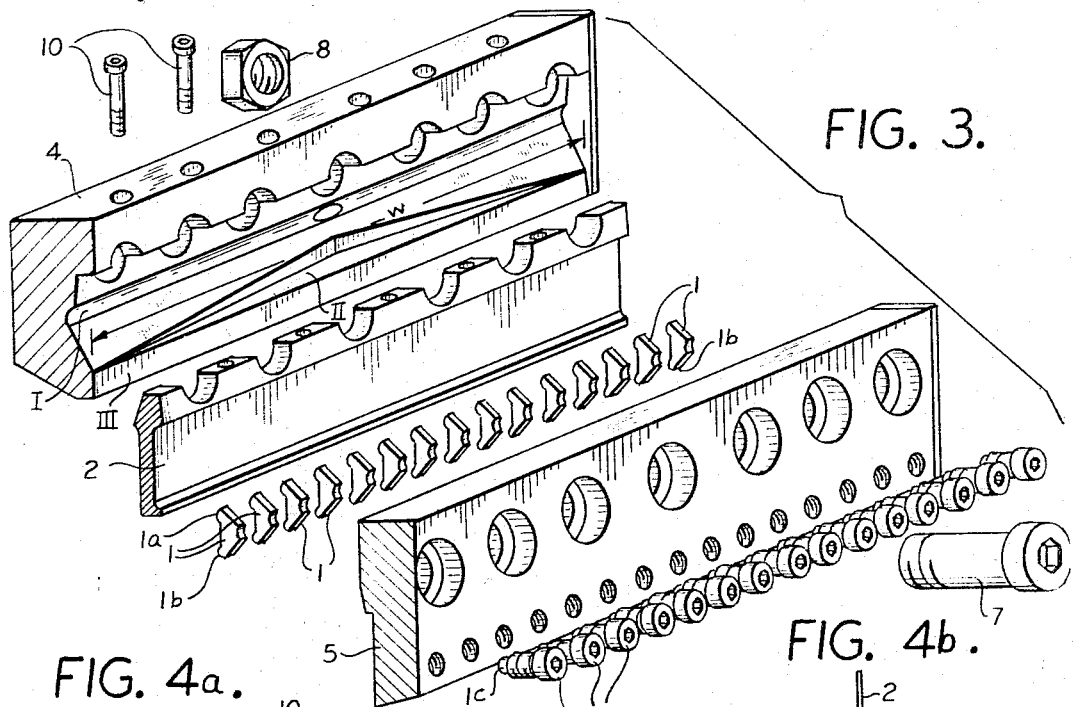
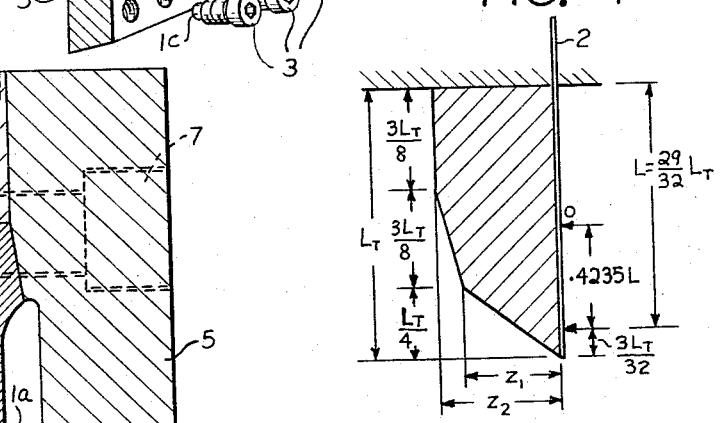
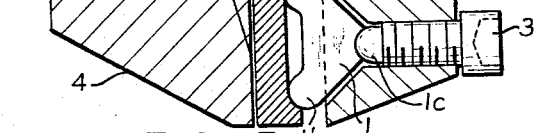
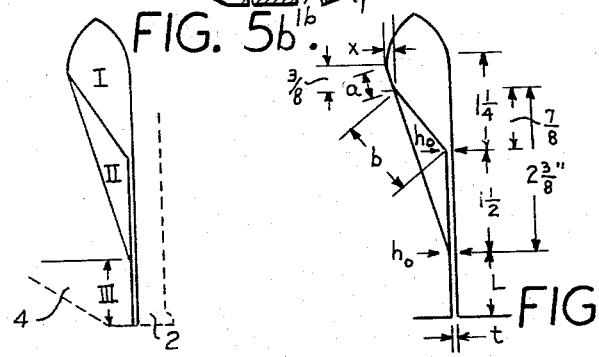
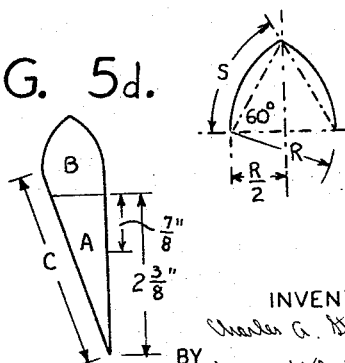
INVENTOR
Charles A. Strange
BY
Emery, Whittemore,
Sandoe & Graham
ATTORNEYS.

United States Patent Office 3,292,211
Patented Dec. 20, 1966

3,292,211
SELF-ADJUSTING EXTRUSION DIE
Charles A. Strange, 2 Rock Road, Morningside,
Milford, Conn.
Filed May 27, 1963, Ser. No. 283,511
9 Claims. (Cl. 18—12)

This invention relates to an extrusion die which is mechanically self-adjusting. More specifically, this invention relates to a plastics extrusion die which automatically changes its lip opening under surges of extruder pressure so as to maintain a constant flow of plastics melt and, consequently, to maintain a more uniform gauge of extruded film or sheeting, pressure surges notwithstanding.

In the design and operation of flat dies for the extrusion of plastics film and sheeting, two problems which are encountered are the springing open of the die under operating pressures, often called "clam shelling," and the requirement to adjust the lip opening differentially along the width of the die in order to make the flow everywhere the same and hence produce a uniform gauge across the web of film or sheeting at a given operating pressure.

These two problems have been variously solved by the incorporation of one flexible or resilient die blade or a flexible flow-restricting bar in the die for adjustment purposes and by building the remainder of the die of very rigid construction.

In the prior art, however, the adjustable blade or bar is locked upon adjustment either in one or both directions so that either it cannot move at all to compensate for the surges in extrusion pressure that are normally encountered in the plastics extrusion process, or if the blade or bar does move, no provision is made for precise control of its motion.

An object of this invention is to sense surges of pressure produced in the plastics melt by the normal pumping action of the extruder screw in concert with temperature fluctuations in the extrusion equipment and, by means of a simple rocker-arm device, to utilize this resultant differential of force against a resilient die blade to increase the die opening (if extrusion pressure drops off) or to decrease the die opening (if extrusion builds up) so as to maintain a constant volume of flow from the die lips.

The discovery that led to this invention was that alloys commonly used for die construction, such as Inconel and air-hardening tool steels, when at the elevated temperatures used in plastics extrusion (viz 400 to 700 degrees Fahrenheit) can be dimensioned to afford the required mechanical strength and yet be sized thin enough to deflect the exact same distances under pressure surges that it is necessary to move the die lips to maintain the flow of plastic constant during these same surges of pressure. The material for the resilient die blade and its dimensions must, of course, be chosen to fulfill the physical and geometric requirements of the mechanism as will be herein explained and exemplified.

To clarify the steps in the mathematical derivation and to depict the mechanical operation of this invention, reference is made to the accompanying drawings in which:

FIGURE 3 is an exploded view of the die showing die components except for the external die heaters;

FIGURE 4a is a cross-sectional view of the die taken at the midpoint along its width;

Figure 1:
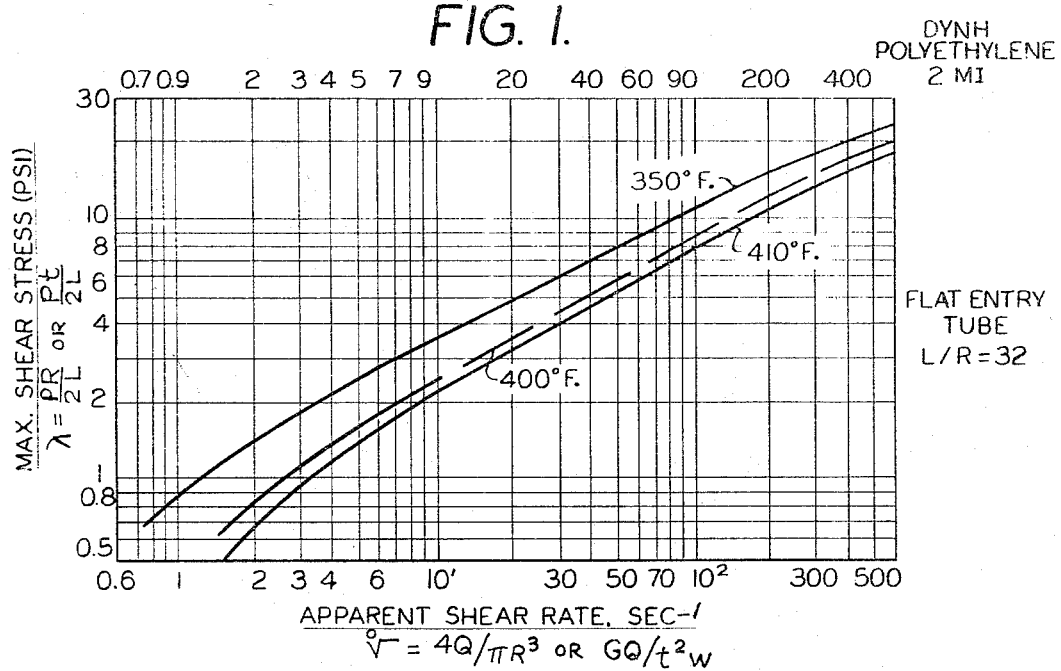
FIGURE 1 is a plot of apparent shear rate against maximum shear stress for a low density polyethylene having a melt index of 2.

FIGURE 4b is a schematic representation of the flexible die blade showing the pattern of loading from the fixed end down to the end of the blade together with the location of the outboard support and the point of maximum deflection; and FIGURES 5 a–d are a cross-sectional schematic views of the flow passages within the die for which the calculations for dimensions, pressures and rates of flow are made.

The steps in the mathematical calculations for the proper dimensions and correct positioning of the parts of the subject device are as follows:

(a) Choose a die width and flow channel shape such as that depicted in the drawings of FIGURES 3, 4a and 5 and divide it into its individual sections of pressure. In the die under consideration, these sections are three in number: Section I, the die manifold, Section II, the manifold-compensating passage or wedge, and Section III, the lip section. See FIGURE 5b.

(b) Choose the plastics to be extruded, the desired plastics melt temperature, the desired flow rate through the die, and the desired operating pressures in the various sections of the die and, utilizing the rheological equations for viscous flow and the proper shear stress-shear rate for the plastics to be extruded, compute the required passage clearances to provide the desired flow rate at the pressures chosen.

(c) Consider the resilient die blade as a beam fixed at one end and supported at a point near to its other end, and consider the die pressures as one constant and two uniformly decreasing loads as depicted schematically in FIGURE 4b. By means of the differential equations for the deflection of beams, derive the equation for the maximum deflection of the beam and the equation for the location of the point of maximum deflection of a beam so loaded and so supported.

(d) Dimension a rocker-arm lever 1 (refer to FIGURE 4a) so that the rounded end of one arm 1a lies on the point of maximum deflection of a die blade 2 and the rounded end of another arm 1b rests against and serves as the support for the outboard end of the blade 2 and the concave-shaped pivot surface of the rocker-arm lever 1 rests against a rounded-end (IC) of the adjustment bolt 3. The die is made in two halves 4 and 5 secured together by bolts 7 with nuts 8; and the blade 2 is attached to the die half 4 by screws 10.

(e) Consider a pressure surge such as is commonly encountered in plastics extrusion equipment. Using the rheological equations for viscous flow, compute both the additional amount of throughput that will be produced by this surge if the die lips are locked at their normal opening and the distance the die lips will have to be closed if the flow is to be held constant during this surge of pressure.

(f) Using the equation previously derived for the deflection of the blade under the internal die pressures desired, solve this equation for the correct thickness of blade to deflect the same incremental distance under the pressure surge that is desired to close the lip to maintain uniform flow during the pressure surge. If either arm of a rocker-arm lever having ams of equal length is moved a finite distance about its pivot, the other arm will be moved an equal distance in the same direction about that pivot. Since the die pressure, and hence the resultant force against arm 1a will be greater than the die pressure and the resultant force on arm 1b, the motion will thus be both the desired amount and in the desired direction to close the lip opening.

Conversely, should the extrusion pressure drop off by this same amount, the deflection of the blade will decrease, arm 1a will no longer touch the blade and the force of the lip pressure behind arm 1b will expand the lip opening until arm $1b$ has moved about he pivot $1c$ sufficiently for arm $1a$ to make contact with and be restrained by the point of maximum deflection of the blade 2.

The method for computing die dimensions and depicting die performance is illustrated in the following two examples:

Example I

A 60 inch wide die is desired that will extrude 2.29 cubic inches per second (226 pounds per hour) of low-density polyethylene of 2 melt index through a lip section one inch long with an opening of approximately 0.02 inch at an operating pressure entering the lip section (Section III of FIGURE $5b$) of 2000 pounds per square inch and at a melt temperature of 400 degrees Fahrenheit.

The modified Poiseuille equation for a plastics melt obeying the power law in flow through a slot is:

$$Q = \frac{K'' W t^{n+2} P^n}{3(2n+1)(Le)^n}$$

where
$Q$ = the volumetric flow in cubic inches per second.
$K''$ = the fluidity factor for the slot, a dimensionless factor related to the round hole fluidity factor $K'$ by $K'' = 3(n+3)K'/4(n+2)$ where
  $K'$ the round hole fluidity $= \nu/\lambda^n$ and $\nu =$ the apparent shear rate at the capillary wall in reciprocal seconds and
  $\lambda$ = shear stress at the capillary wall in pounds per square inch
$n$ = the exponential flow behavior index
$W$ = the slot width in inches
$t$ = the slot aperture in inches
$P$ = pressure drop across the slot length
$Le$ = the effective slot length, relating it to the equipment in which the data published for the plastics were gathered, inches.
$Le = L(b)(a+6)/(a)(b+6)$
where
  $L$ = the actual slot length in inches
  $b$ = the ratio of $L/t$
  $a = L_1/R_1$ where $L_1$ and $R_1$ are respectively the length and radius of the capillary in which the published data for the plastics were gathered.

Referring to FIGURE 1, and assuming a straight line relationship between the points ($\lambda=3$, $\nu=15$) and ($\lambda=9$, $\nu=105$), by the relationship $\nu = K'\lambda^n$, $15 = K'(3)^n$ and $105 = K'(9)^n$ thus $(9/3)^n = 105/15 = 3^n$ and $n = 1.77$.

From the same relationship, $$\nu = K'\lambda^n, \quad 15 = K'(3)^{1.77}$$

and $$K' = 2.15.$$

The fluidity factor for the slot $$K'' = 3(1.77+3)(2.15)/4(1.77+2) = 2.04.$$

The corrected length for the slot to rectify it to the data collected for FIGURE 1 in a capillary of $L_1/R_1 = 32$ is $$Le = (1)(50)(32+6)/(32)(50+6) = 1.06 \text{ inch.}$$

Substituting the modified Poiseuille equation and solving for $t$.

$$t^{n+2} = \frac{Q(3)(2n+1)(Le)^n}{K'' W P^n}$$

$$t^{3.77} = \frac{2.29(3)(2^{2.77})(1.06)^{1.77}}{2.04 \times 60(2000)^{1.77}}$$

$$t^{3.77} = \frac{2.29(3)(6.8)(1.109)}{2.04(60)(696,000)} = 6.08 \times 10^{-7}$$

$$t = 0.022444$$

Thus, a 2000 pound per inch pressure at the entrance to the lip section (Section III in FIGURE $5b$) will produce the desired flow of 2.29 cubic inches per second, if the lip opening is at 0.0224 inch.

Utilizing the same equation, and considering a pressure surge of 150 pounds per square inch, solve for the flow during this momentary pressure of 2150 pounds per square inch, if the lips are locked at the 0.0224 inch opening.

$$Q_2 = \frac{K'' W P_2{''}^{n} t^{n+2}}{3(2n+1)(Le^n)} = \frac{2.04 \times 60(21.50)^{1.77}(6.08 \times 10^{-7})}{3(2^{2.77})(1.06)^{1.77}} =$$

$$\frac{2.04 \times 60 \times 7.914 \times 10^5 \times 6.08 \times 10^{-7}}{3(6.8)(1.109)} = 2.6$$

an increase of 13½ percent in flow.

Again, using the same equation, it is seen that to hold the flow constant during this momentary surge, the die lips must be closed to:

$$t_2^{3.77} = \frac{2.29(3)(2^{2.77})(1.06)^{1.77}}{2.04 \times 60(2150)^{1.77}}$$

$$= \frac{2.29(3)(6.8)(1.109)}{2.04(60)(7.914 \times 10^5)} = 5.35 \times 10^{-7}$$

$$t_2 = 0.021697$$

or a distance of $0.022444 - 0.021697 = 0.000747$ inch. It is further desired for design purposes that the pressure drop produced by the manifold (Section I in FIGURE $5b$) be 150 pounds per square inch to produce uniform flow across the width of the die and, since the manifold per se offers a resistance that varies from zero in the center to a maximum at the ends, the compensating wedge section II, offer a counterbalancing resistance equal to a 150 pounds per square inch drop in pressure.

Over its 60 inch width W, the wedge section II varies uniformly in length L from 1½ inches at the center of the die to zero at the ends, and in wall clearance $t$ from 0.0224 inch where it meets the lip section III to a larger value (to be computed) where it meets the manifold section I. Considering a mean length of 0.75 inch, and a mean pressure differential of 75 pounds per square inch across the mean length, the calculation is made for the mean wall clearance.

Assuming a mean wall clearance of 0.063 inch, the effective length becomes $$Le = \frac{12}{32}\left(\frac{32+6}{12 \times 6}\right)(0.75) = 0.594 \text{ in.}$$

Substituting in the modified Poiseuille equation, the mean clearance ($t_m$) becomes $$t_m^{3.77} = \frac{3(2.29)(2^{2.77})(0.594)^{1.77}}{2.04(60)(75)^{1.77}}$$

$$t_m = 0.0789 \text{ in.}$$

Dimensioning of the tear-drop shaped manifold passage is chosen so as to balance the pressure drop across the compensating wedge section, namely the 150 pounds per square inch differential mentioned above. For convenience of calculations, a trial-and-error method is used whereby a value of R (see FIGURE $5a$) is found to satisfy the required flow at the aforementioned pressure differential. The two ends of the die are assumed to divide the flow evenly so that 2.29/2 or 1.145 cubic inches per second enters each side of the manifold from the center feed port. Furthermore, since all of the feed material that enters from the feed port has gone out the slit by the time it reaches the outboard end, the average volume flow along one side of the manifold is assumed to be one half the amount entering or 1.145/2 equals 0.572 cubic inch per second.

For purposes of calculation, the manifold cross-section is divided into two parts (see FIGURE $5d$) Part A, the triangular shaped section whose vertical leg increases from ⅞ inch at the center of the die to 2⅜ inches at the ends (mean equal 1⅝ inches) and whose mean wall clearance $t_m$ equals $$\left[\left(R=\frac{0.375R}{2.75}\right)+0.06693\right]\div 2$$

Assuming an R equal to 0.755 inch, ($t_m$) equals $(0.652+0.067)_2=0.354$ $$L/t_m \text{ equals } \frac{30}{0.354}=85$$

and the equivalent length $$Le=L\frac{b}{2}\left(\frac{a+6}{b+6}\right)=30\left(\frac{85}{32}\right)\left(\frac{32+6}{85+6}\right)=33.2$$

An equation approximating the flow through the wedge is given by $$Q_A=\frac{K''P^n z(z \tan \phi+h_0)^{n+2}}{3L_e{}^n 2^{n+1}}$$

where $$\text{TAN } \theta=\frac{R-\frac{0.375R}{2.75}-0.067}{1.625}$$

and $h_0=0.067$.
Substituting:

$$Q_A=\frac{2.04(150)^{1.77}1.625(0.585+0.067)^{3.77}}{3(33.2)^{1.77}(2)^{2.77}}=$$

0.474 cubic inch per second

In the case of the arch-shaped sector B (see FIGURE 5d) the shear stress ($\lambda$)

$$\lambda=\frac{PA}{P_{RW}Le}$$

where $P=150$ p.s.i., A, the area in square inches $$A=0.614R^2+\frac{3}{8}\left(R-\frac{0.375R}{5.5}\right)$$

$P_{RW}$, the wetted perimeter $$P_{Rw}=\frac{2\pi R}{3}+\frac{3}{8}+\sqrt{0.375^2+\left(\frac{0.375R}{2.75}\right)}$$

in inches and Le is the corrected length in inches. Assuming $R/2$ to represent the approximate center of the sector and choosing an R equal to 0.755 inch, $$b=L/0.5R=\frac{30}{0.5\times 0.755}=79$$

and $$Le=L\frac{b}{a}\left(\frac{a+6}{b+6}\right)=30\left(\frac{79}{32}\right)\left(\frac{38}{85}\right)=33.1 \text{ in.}$$

$$A=0.614(0.755)^2+0.375\left(0.755-\frac{0.755(0.375)}{5.5}\right)=$$
0.614 sq. in.

$$P_{Rw}=\frac{2\pi(0.755)}{3}+0.375+$$

$$\sqrt{0.375^2+\left(\frac{0.375(0.755)}{2.75}\right)^2}=2.344 \text{ in.}$$

$$\lambda=\frac{150(0.614)}{2.344(33.1)}=1.185 \text{ p.s.i.}$$

and $\dot{\nu}=K'\lambda^n$, $K'=2.15$, $n=1.77$, $$\dot{\nu}=2.15(1.185)^{1.77}=2.90 \text{ sec.}^{-1}$$

For a section such as B, the shear rate is approximately equal to $$\dot{\nu}=32Q_B/\pi R^3$$

Solving for $(Q_B)=\dot{\nu}\pi R^3/32=2.9\pi(0.755)^3/32=0.1225$ cu. in./sec.

and $(Q_{total})=(Q_A)+(Q_B)=0.1225+0.474=0.5965$ which is within 4.2 percent of the desired 0.572 cubic inch per second flow.

Referring to FIGURES 4a and 4b and summarizing, the operating conditions and die dimensions have been chosen such that over the resilient blade 2 which is 4 inches in length (Lt) and 60 inches wide, the pressure at the fixed end and extending a distance 1½ inches therefrom, or 3Lt/8, is a uniform 2150 pounds per square inch. From this point and extending an additional 1½ inches, or 3Lt/8, the pressure uniformly decreases from 2150 pounds per square inch to 2000 pounds per square inch, and for the remaining one inch of length, or Lt/4, the pressure against the blade decreases uniformly from 2000 pounds per square inch to zero. For reasons of strength and practicality of machining, a rocker arm lever is chosen, the legs of which are rounded to ¼ inch radii and the rounded end of arm 1b (FIGURE 4a) is positioned such that it contacts the blade at a distance (L) from the fixed end of the blade equal to 29Lt/32. The blade so loaded is represented schematically in FIGURE 4b as a beam fixed at one end and supported at a distance of 3Lt/32 inward from the other end and the loading is shown by the coordinates $Z_2$ equals 2150 pounds per square inch, and $Z_1$ equals 2000 pounds per square inch, from which:

$$(Z_2)-(Z_1)=150=0.075(Z_1)$$

Assuming that the point $o$ lies in the region between $3L_t8$ and $3L_t4$ from the fixed end, the loading at point $o$ is represented by ($Z_x$).
From symmetry $$\frac{Z_x-Z_1}{X-\frac{5L}{29}}=\frac{Z_2-Z_1}{\frac{12L}{29}}$$

and substituting $$Z_2-Z_1=0.075Z$$

$$Z_x-Z_1=0.075Z_1(29_x-5L)/12L$$

Taking moments about point $o$, which lies a distance $x$ from the support, and equating to the second derivative results in the equation of the slope of the slope curve:

$$EI\frac{d^2y}{dx^2}=R_x-\left(\frac{Z_x-Z_1}{2}\right)\left(x-\frac{5L}{2g}\right)\left(\frac{x}{3}-\frac{5L}{2g(3)}\right)-$$
$$Z_1\left(x-\frac{5L}{29}\right)\left(\frac{x}{2}-\frac{5L}{29(2)}\right)-$$
$$\frac{Z_1}{2}\left(\frac{8L}{29}\right)\left(x-\frac{5L}{29}+\frac{8L}{3(29)}\right)$$

The total load on the beam ($W_T$) is equal to:

$$W_T=\frac{3}{2}(0.075)Z_1\left(\frac{12L}{29}\right)+Z_1\left(\frac{24L}{29}\right)+\frac{Z_1}{2}\left(\frac{8L}{29}\right)$$

Solving for $Z_1$ $$Z_1=29W_T/29.35L$$

Substituting in the equation of the slope of the slope curve and rearranging:

$$EI\frac{d^2y}{dx^2}=Rx-\frac{0.075(29)W_T X^3}{3(24)(29.35)L^2}-\frac{1042W_T X^2}{3(24)(29.35)L}+$$
$$\frac{2082.375W_T X}{3(24)(29.35)(29)}-\frac{6487W_T L}{3(24)(29.35)(29)^2}$$

Performing the first integration, the equation of slope is:

$$EI\frac{dy}{dx}=\frac{Rx^2}{2}-\frac{0.075(29)W_T X^4}{4(3)(24)(29.35)L^2}-\frac{1042W_T X^3}{3(3)(24)(29.35)L}+$$
$$\frac{2082.375W_T X^2}{2(3)(24)(29.35)(29)}-\frac{6487W_T LX}{3(24)(29.35)(29)^2}+C_1$$

Since at the fixed end, where $(x)=(L)$, the slope $$\left(\frac{dy}{dx}\right)$$

is zero:

$$0 = \frac{RL^2}{2} - \frac{0.075(29)W_T L^2}{4(3)(24)(29.35)} - \frac{1042 W_T L^2}{3(3)(24)(29.35)} + \frac{2082.375 W_T L^2}{2(3)(24)(29.35)(29)} - \frac{6487 W_T L^2}{3(24)(29.35)(29)^2} + C_1$$

and $$C_1 = \frac{3,226,286.275 W_T L^2}{3(24)(29.35)(29)^2(12)} - \frac{RL^2}{2}$$

Substituting for C, $$EI\frac{dy}{dx} = \frac{RX^2}{2} - \frac{RL^2}{2} - \frac{0.075(29)W_T X^4}{4(3)(24)(29.35)L^2} - \frac{1042 W_T X^3}{3(3)(24)(29.35)L} + \frac{2082.375 W_T X^2}{2(3)(24)(29.35)(29)} - \frac{6487 W_T L X}{3(24)(29.35)(29)^2} + \frac{3,226,286.275 W_T L^2}{3(24)(29.35)(29)^2(12)}$$

Performing the second integration, the equation of the elastic curve is:

$$EIy = \frac{RX^3}{6} - \frac{RL^2 X}{2} - \frac{0.075(29)W_T X^5}{60(24)(29.35)L^2} - \frac{1042 W_T X^4}{36(24)(29.35)L} + \frac{2082.375 W_T X^3}{18(24)(29.35)(29)} - \frac{6487 W_T L X^2}{(2)(3)(24)(29.35)(29)^2} + \frac{3,226,286.275 W_T L^2 X}{3(24)(29.35)(29)^2(12)} + C_2$$

Beneath the support, the beam does not sag. $y=0$, $x=0$, thus $C_2 = 0$

For convenience, let $$M = 3(24)(29.35)(29)^2(12)$$

At the fixed end, $y=0$ and $x=L$; substituting:

$$0 = \frac{RL^3}{6} - \frac{RL^3}{2} - \frac{1,097,505 W_T L^3}{M} - \frac{3,505,288 W_T L^3}{4M} + \frac{362,333.25 W_T L^3}{3M} - \frac{77,844 W_T L^3}{2M} + \frac{3,226,286.275 W_T L^3}{M}$$

and the reaction at the support R equals $0.342 W_T$

Substituting for (R) in the equation for the elastic curve:

$$EIy = \frac{-13,170.06 W_T X^5}{12ML^2} - \frac{10,515,864 W_T X^4}{12ML} + \frac{16,033,668.12 W_T X^3}{12M} - \frac{467.064 W_T X^2 L}{12M} - \frac{5,037,570.06 W_T L^2 X}{12M}$$

Differentiating to obtain the equation of slope:

$$EI\frac{dy}{dx} = -\frac{5(13,170.06)W_T X^4}{12ML^2} - \frac{4(10,515,864)W_T X^3}{12ML} + \frac{3(16,033,668.12)W_T X^2}{12M} - \frac{2(467.064)W_T X L}{12M} - \frac{5,037,570.06 W_T L^2}{12M}$$

To locate the point of maximum deflection, the equation of slope is equated to zero. Multiplying and changing signs and substituting for (M):

$$0 = 65,850.3 X^4 + 42,063,456 X^3 L - 48,101,004.36 X^2 L^2 + 934,128 X L^3 + 5,037,570.06 L^4$$

The slope is zero at the fixed end, so $x - L = 0$ must be one factor of this equation. Dividing by $x - L$, the remaining equation is:

$$0 = 65,850.3 X^3 + 42,129,306.3 X^2 L - 5,971,698.06 X L^2 - 5,037,570.06 L^3$$

Solving for $x$; the positive root of this equation is:

$$X = 0.4235 L$$

or, since $L = 29 L_T/32$, and because $L_T = 4$ in., the point of maximum deflection lies 1.535 inches inward from the support. Substituting the value $X = 0.4235L$ in the equation for the elastic curve, the amount of maximum deflection, $y$ equals $$y = \frac{0.00519 W_T L^3}{EI} = \frac{0.003865 W_T L_T^3}{EI}$$

Two operating conditions were previously described. Under condition (1), the die blade of 60 inch width W and 4 inch length $L_T$ provided a desired 2.29 cubic inches per second throughput through a 0.0224 inch lip opening $t$ under a pressure entering the lip section III of 2000 pounds per square inch ($Z_1 = 2000$) and leaving the manifold, Section I, of 2150 pounds per square inch ($Z_2 = 2150$). Under this condition, the total load on the blade equals:

$$W_{T_1} = \left[ \frac{Z_1}{2}\left(\frac{L_T}{4}\right) + \frac{3}{2}\left(\frac{3L_T}{8}\right)(Z_2 - Z_1) + \frac{3L_T}{4}(Z_1) \right] = 440{,}250 \text{ pounds}$$

Under condition 2 a momentary 150 pounds per square inch surge of pressure, the other dimensions remain the same, but the pressures $Z_1$ and $Z_2$ become respectively 2300 and 2150 pounds per square inch. In this case, the total load on the blade equals $$W_{T_2} = 471{,}750 \text{ pounds.}$$

It was previously shown by calculation that, to hold the flow constant at 2.29 cubic inches per second during the 150 pounds per square inch surge of pressure, the lip opening $t$ would have to be reduced to 0.021697 inch, i.e. closed by $0.022444 - 0.021697 = 0.000747$ inch. It is desired to find the moment of inertia I and thence the thickness $h$, since $I = bh^3/12$ for a rectangular section, of the 60 inch long rectangular blade ($b = 60$) which will deflect the required additional distance under 150 pounds per square inch additional load. From the International Nickel Company published data on Inconel-X, at 700 degrees Fahrenheit $E = 27{,}000{,}000$ pounds per square inch. Since $$y = \frac{0.003865 W_r L_r^3}{EI}$$

$$\Delta y = \frac{0.003865(W_{r(2)} - W_{r(1)})L_r^3}{EI}$$

$$0.000747 = \frac{0.003865(471{,}750 - 440{,}250)4^3}{27{,}000{,}000 \, I}$$

$$I = 0.385 \text{ inch}^4$$

Since $$I = bh^3/12, \quad \frac{60 h^3}{12} = 0.385, \quad h = 0.425 \text{ inch}$$

The blade 2 for the die under consideration will be machined to a thickness of 0.425 inch.

Returning to the equation for the maximum deflection of the blade, and substituting the value of 0.385 inch⁴ for I 27,000,000 pounds per square inch for E, 440,250 pounds for $W_{T1}$ and 4 inches for $L_T$, it is found that the blade so supported and under pressures $Z_2 = 2150$ pounds per square inch and $Z_1 = 2000$ pounds per square inch, deflects $$y = \frac{4^3 (0.003865)(440{,}250)}{27{,}000{,}000 \times 0.385}$$

$= 0.0105$ inch at a distance 1.535 inches from the support.

Referring to FIGURE 4a, the discriminating reader will recognize that at the neutral or desired operating conditions, the blade 2 is bowed a distance 0.0105 inch to the right and consequently arm 1a of the rocker arm lever is displaced an equal distance from an imaginary vertical drawn upward from the point where arm $1b$ impinges upon the blade. This amounts to an angle $\alpha$ with the vertical whose tangent equals 0.0105/1.535. Strictly speaking, the horizontal center line of the adjustment bolt 3 should be made to lie at this same angle $\alpha$ with the horizontal. Because arc tangent 0.0105/1.535 is equal to only 24 minutes of arc, however, this discrepancy is compensated for by constructing the pivot of the rocker arm such that it lies on the rubbing surface between the rounded end $1c$ of the adjustment bolt 3 and the concave-shaped pivot surface of the rocker arm lever 1.

A second function of the adjustment bolt 3 is to permit other orifice settings than the ones used in the examples herein and the reason for the multiplicity of the adjustment bolts and rocker arm levers (it is recommended that they be provided on 1½ or 2 inch centers across the width of the die) is to permit various orifice settings down the width of the blade such as a wider opening at the ends than at the center of the die as may be desired. In Example I under consideration, the desired orifice is uniform and equal to 0.0224 inch under the operating conditions.

Assume that the fixed half of the die 4 has been machined to afford a clearance between the end of the blade 2 and the fixed half of the die 4 equal to 0.012 inch under no internal pressure. It is desired that the lip opening be 0.0224 inch under a pressure entering the lip section III of 2000 pounds per square inch at which pressure it has been previously computed the blade 2 will have a maximum deflection of 0.0105 inch. Set up procedure is as follows:

Adjustment screw 3 is backed away until a shim 0.0224−0.012+0.0105=0.0209 (approximately 21 mils) may be inserted between arm $1c$ and the blade 2. Under the operating pressure, then, blade 2 will bow 0.0105 inch, the outboard end of the blade will move outward under the pressure of extrusion until it contacts arm $1b$ which, in turn, will be restricted from moving further than to allow the lip opening to increase to the desired 0.0224 inch opening by the impingement of arm $1a$ against the blade at its point of maximum deflection.

Whereas the dimensions of the design for Example I are computed to compensate exactly for a pressure surge of 150 pounds per square inch, it is of interest to compute its performance at other conditions. Using the same relationships and component dimensions, it is found that:

Under a 300 pounds per square inch pressure surge, the maximum deflection of the blade will increase by an additional 0.001735 inch, which will cause the lips to close to 0.0022444−0.001735=0.020709 inch and permit a flow during this surge of pressure of 2.165 cubic inches per second, a value lower than the desired 2.29 cubic inches per second by less than 5½ percent.

Under a 150 pounds per square inch pressure drop below the 2000 pounds per square inch design pressure, the maximum deflection of the blade will decrease by 0.00075 inch, which will open the lips to 0.023194 inch and the resultant flow will be 2.26 cubic inches per second, about 1.3 percent below the desired value.

Under a 300 pounds per square inch pressure drop below the 2000 pounds per square inch design pressure, the maximum deflection of the blade will decrease by 0.001495 inch, which will open the lip to 0.02394 inch and the resultant flow will be 2.19 cubic inches per second, about 4.4 percent below the desired value.

*Example II*

Figure 2:
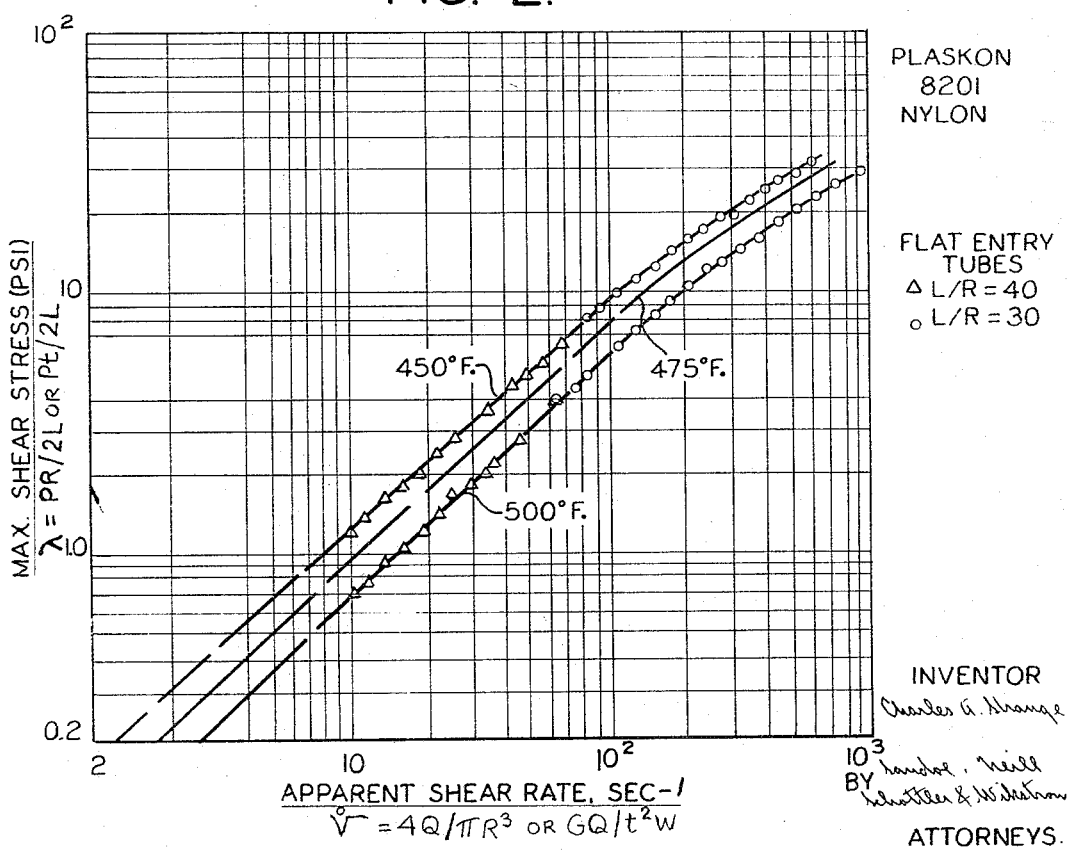
FIGURE 2 is a plot of apparent shear rate against maximum shear stress for a polycaprolactam nylon.

A basically similar die is used to extrude polycaprolactam nylon at a melt temperature of 475 degrees Fahrenheit. The die width W is 60 inches, length of lip section III, L, of one inch, and a lip opening $t$ of 0.02 inch. Referring to FIGURE 2, and using the same procedure as in Example I, $n=1.106$, $K'=10.45$, $K''=10.35$, $Le$ for the lip section III is 1.045 inches, and under pressure $Z_1$ of 2000 pounds per square inch, the flow Q equals 1.085 cubic inches per second, equivalent to 144 pounds per hour of this material.

The mean wall clearance in the compensating wedge section II for this flow of nylon to provide a pressure drop of 150 pounds per square inch is 0.0574 inch and the R for the manifold tear drop is 5/16 inch. Assuming a 150 pounds per square inch surge of pressure and the lip opening locked at 0.02 inch, the flow during the pressure surge would be 1.26 cubic inches per second, or an undesired increase of 16 percent. To hold the flow constant at 1.085 cubic inches per second, despite the increase of pressure, the lips must be closed to 0.01949 inch, a distance of 0.02000−0.01849=0.00051 inch.

The moment of inertia I of a 4 inch blade, 60 inches long of Inconel–X loaded as in FIGURE 4b and operating at a temperature of 475 degrees Fahrenheit that will deflect 0.00051 inch under an incremental pressure of 150 pounds per square inch is 0.566 inch$^4$, which corresponds to a thickness of 0.486 inch.

Under an operating pressure $Z_1$ entering the lip section III, this blade will exhibit a maximum deflection of 0.00732 inch beneath arm $1a$.

Under a 150 pounds per square inch drop in pressure, the maximum deflection of the above blade will decrease by 0.00051 inch, which will open the lips to 0.02051 inch and the resultant flow will be 1,073 cubic inches per second, or about 1.1 percent below the desired value.

Under a 300 pounds per square inch surge in pressure, the maximum deflection will increase by 0.00118 inch, which will close the lip opening to $$0.02000 - 0.00118 = 0.01882$$

inch. The resultant flow at this lip opening and a pressure of 2300 pounds per square inch entering the lip section III is 1.065 cubic inches per second, or 1.8 percent below the desired value. Under a 300 pounds per square inch drop in pressure, the maximum deflection of the blade will decrease a distance of 0.00102 inch from the deflection at 2000 pounds per square inch which will open the lips to 0.02000+0.00102=0.02102 inch. At this lip opening and a lip entrance pressure of 1700 pounds per square inch, the flow will be 1.062 cubic inches per second or 2.1 percent lower than the desired value.

The foregoing examples are merely illustrations of certain embodiments of the invention, and are not to be construed as limitations thereof. Die blades having shapes other than rectangular may be used, if desired. Also, lip-actuating levers may be chosen having arms of unequal lengths and the force-sensing arm may be located other than at the point of maximum deflection of the blade. It is only necessary that calculations be made to determine the resultant force against some point along the flow channel when the die is operating at a desired output rate through a desired slot opening, to compute the distance the lip will have to be closed or opened to maintain the flow constant during those intervals when the extrusion pressure surges or drops off, and to provide a dimensioned mechanical lever that will operate to close or open the lip aperture the necessary amount to maintain uniform flow. The operation of the present invention is useful in controlling the thickness of flat film and sheeting as well as plastics coatings applied to other base materials such as paper, cardboard or webs of other plastics.

The preferred embodiment of the invention has been illustrated and described, but changes and modifications can be made and some features can be used in different combinations without departing from the invention as defined in the claims.

What is claimed is:

1. A die for extruding a viscous melt in sheet form, said die including a chamber having an outlet passage therefrom, the outlet passage being an elongated slot, the width of which extends lengthwise of the chamber, walls forming a top and bottom of the outlet passage and terminating in lips at the discharge end of the passage, at least one of the passage walls being movable with respect to the other to adjust the spacing of the lips from one another and the resulting thickness of the extruded sheet, means for applying force to the movable wall near the lip end of the movable wall of the passage and in a direction to move the lips closer together, said means including a force-transmitting operative connection connected with a part of a wall of the chamber that is exposed to pressure of the viscous melt in the chamber, said force-transmitting connection being constructed and arranged to move the lips closer together in response to increase in pressure in the chamber.

2. The die described in claim 1 characterized by the means for applying force to the movable wall including a plurality of substantially parallel levers spaced from one another along the width of the outlet passage.

3. The die described in claim 1 characterized by the means for applying the force to the movable wall including a lever system having an inner end of a lever pressing against a movable wall adjacent to the region of maximum deflection of the wall by the pressure of the material in the chamber, and an outer end of a lever of said lever system pressing against a movable wall near the discharge end of the passage from which material is extruded from the die.

4. The die described in claim 3 characterized by the lever system including a lever having arms of equal length, the region of maximum deflection of the wall being subject to the pressure in the chamber at the upstream end of the outlet passage through which material is extruded from the die, and the lever having a rounded end at the termination of one of its arms in contact with the wall at said region, the lever having a rounded end at the termination of the other of its arms in contact with the wall adjacent to the discharge end of the extrusion passage where the pressure is less than in the chamber by an amount equal to the pressure drop through said passage whereby the end of the lever adjacent to the discharge end of the passage exerts force against one side of the wall greater than that of the viscous melt against the other side of the wall.

5. The die described in claim 1 characterized by the height of the extrusion passage becoming progressively greater, along at least a part of the length of said passage, toward the chamber end of the passage along at least a part of the width of said passage whereby pressure drop is different at different locations along the width of the passage.

6. The die described in cliam 5 characterized by a shim within the die for effecting the change in the cross-section of the passage, the shim tapering to less height toward the end facing the chamber and the shim tapering to less length toward both sides of a maximum length center portion of the shim that substantially coincides with the lengthwise center line of the die.

7. A die for extruding a viscous melt in sheet form, the flow passage of which comprises an elongated manifold leading into a slot one wall of which slot is of rigid construction and the other wall of which simulates a beam which is fixed at one end and supported at two points, one at or near the other end one near to or at the point of maximum deflection, said supports being the rounded arms of a rocker-arm lever such that the beam is free under rolling contact to undergo rotating about these support points and that the rocker-arm lever having an adjustable point of pivot.

8. An extrusion die of claim 7 the adjustable blade of which is in the geometrical shape of a beam and the dimensions and material of construction of which are such that being fixed at one end and supported at a point inward from the other end, it will deflect an incremental distance under an incremental surge in extrusion pressure, this distance being equal to the distance the slot must be closed to maintain the flow constant during the surge in pressure.

9. The die described in claim 1 characterized by the movable wall being subject to pressure of the viscous melt in the chamber and along the length of the outlet passage, the means for applying force to the movable wall being a part of a lever that contacts with the movable wall at a location adjacent to the lip, and the force-transmitting connection being another part of the lever at another location back from the lip, and a fulcrum on which the lever rocks to move the end of the lever that is adjacent to the lip inward as the distortion of the wall moves the other end of the lever outward, there being a plurality of such levers spaced from one another along the width of the passage, and a different fulcrum for each of the levers, and individually adjustable means for moving the fulcrums of the respective levers to change the effective action of the different levers at different locations along the width of the die.

References Cited by the Examiner
UNITED STATES PATENTS 2,168,889    8/1939    Thomas _____ 264—40 X
3,067,464   12/1962    Nicholson _____ 18—12

WILLIAM J. STEPHENSON, *Primary Examiner.*